United States Patent [19]
Packard

[11] Patent Number: 5,663,856
[45] Date of Patent: Sep. 2, 1997

[54] THIN FILM MAGNETIC HEAD WITH ENHANCED GAP AREA ENHANCED BY SURROUNDING MATERIALS OF HARD AND ELECTRICALLY CONDUCTIVE MATERIAL

[76] Inventor: Edward L. Packard, 908 Noreen Ct., San Marcos, Calif. 92069

[21] Appl. No.: 604,049

[22] Filed: Feb. 20, 1996

Related U.S. Application Data

[63] Continuation-in-part of Ser. No. 349,982, Dec. 6, 1994.
[51] Int. Cl.⁶ .............................. G11B 5/187; G11B 5/147
[52] U.S. Cl. ................................. 360/122; 360/126
[58] Field of Search .............................. 360/123, 119, 360/125–126, 128, 121, 122

[56] References Cited

U.S. PATENT DOCUMENTS

| | | | |
|---|---|---|---|
| Re. 29,326 | 7/1977 | Lazzari | 360/119 |
| 4,636,902 | 1/1987 | Dalziel | 360/122 |
| 5,189,580 | 2/1993 | Pisharody | 360/126 |

*Primary Examiner*—A. J. Heinz
*Attorney, Agent, or Firm*—Robert S. Kelly

[57] ABSTRACT

A thin film magnetic head assembly having a gap area upon which is deposited an electrically conductive by non-magnetically conductive material such as copper. This material, which may be placed directly adjacent to all faces of the gap except for the writing face thereof adjacent the recording media, acts to block the high frequency electromagnetic radiation from the sides and top of the gap by confining the electrical field within a very narrow layer of material. A layer of hard material may also be placed at or near the gap to protect the head core material from track-edge rolloff and pole tip recession.

16 Claims, 3 Drawing Sheets

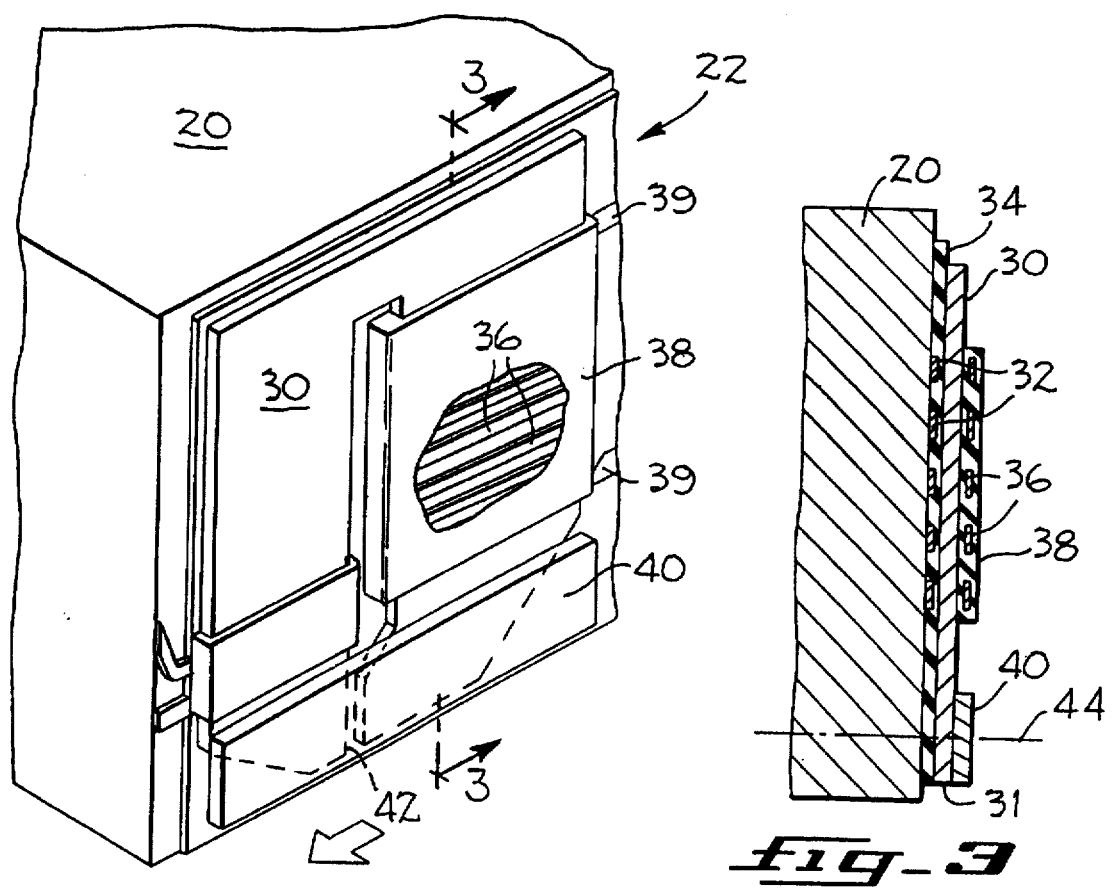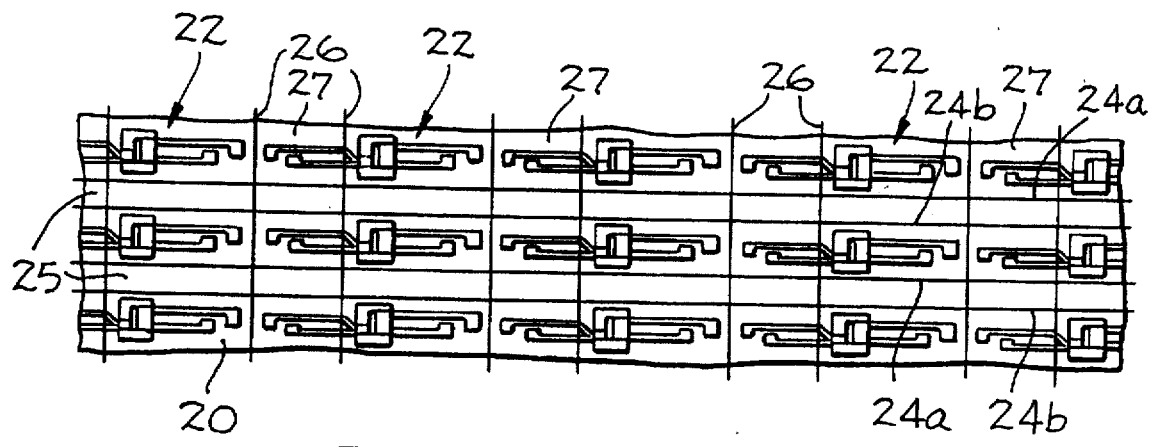

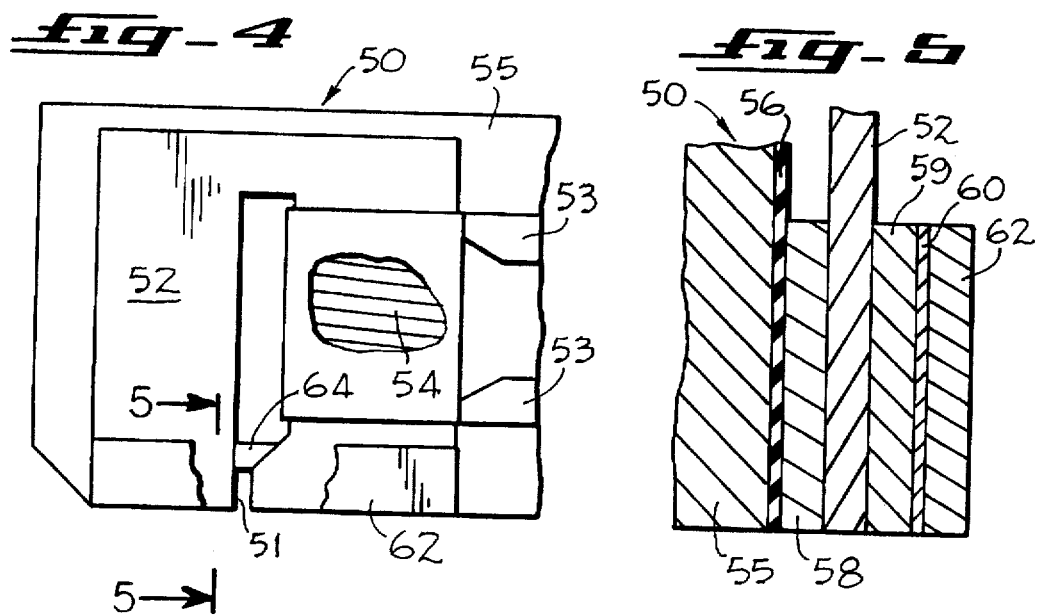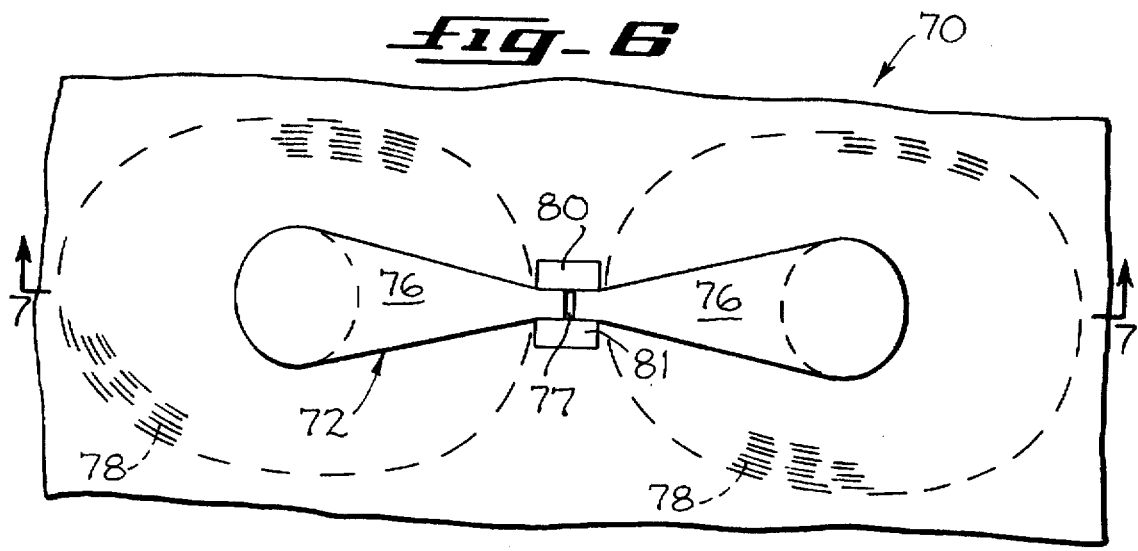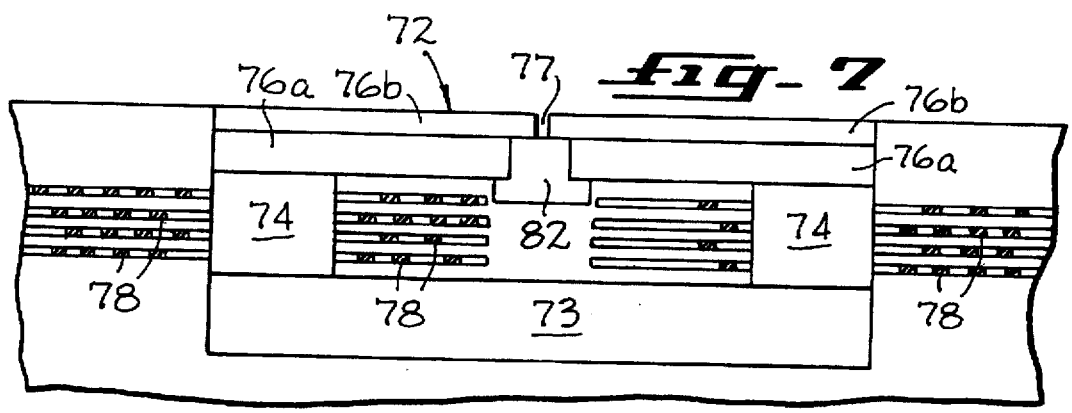

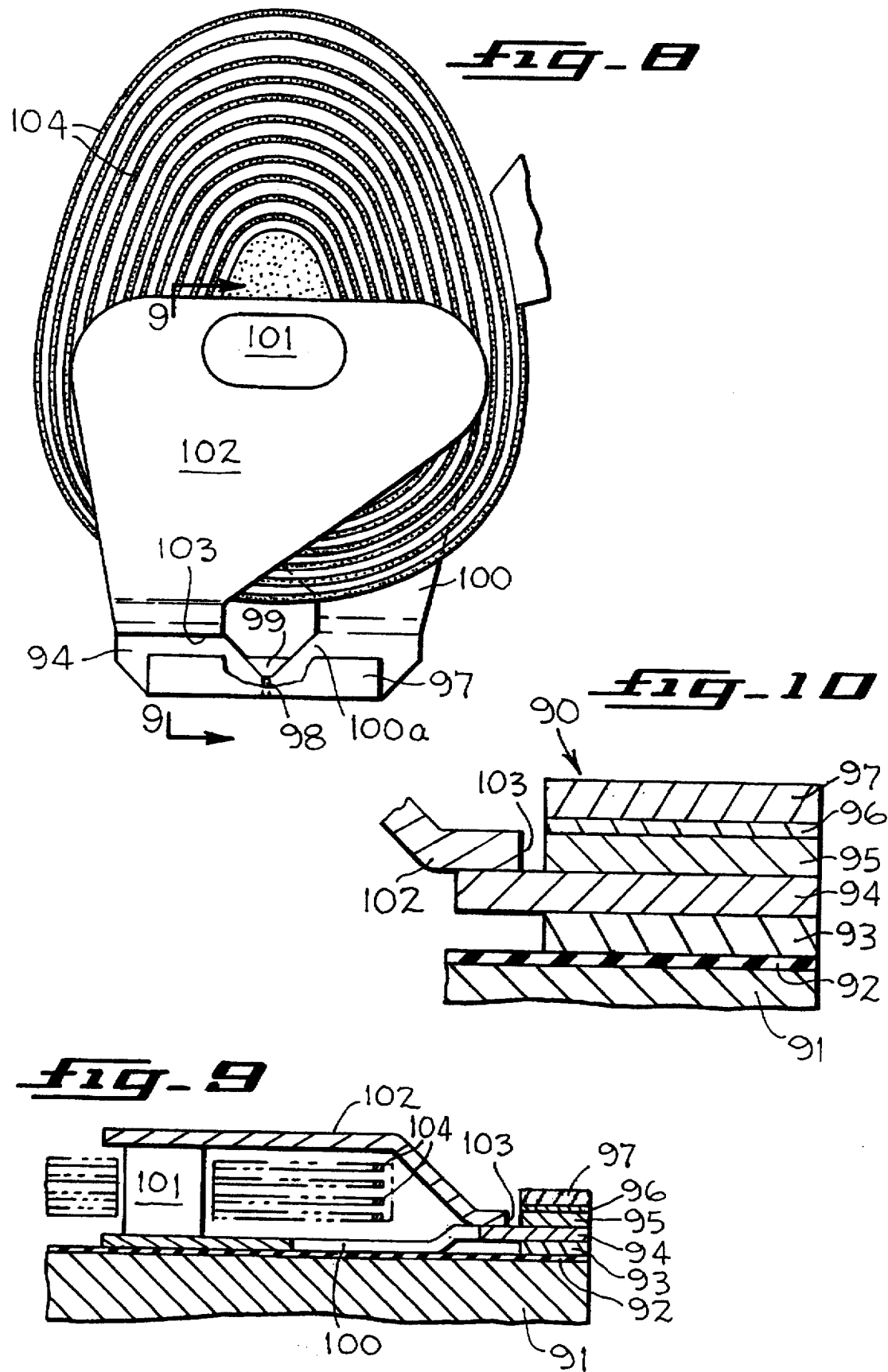

THIN FILM MAGNETIC HEAD WITH ENHANCED GAP AREA ENHANCED BY SURROUNDING MATERIALS OF HARD AND ELECTRICALLY CONDUCTIVE MATERIAL

CROSS-REFERENCE TO RELATED APPLICATION

This application is a continuation-in-part of U.S. patent application Ser. No. 349,982, filed on Dec. 6, 1994, by Edward L. Packard, and entitled MAGNETIC HEADS AND METHOD OF MAKING SAME.

FIELD OF THE INVENTION

The present invention pertains to electromagnetic heads for the writing or writing/reading of information on a relatively moving magnetic recording medium, and more particularly, it pertains to the gap area construction of such heads and to the means for enhancing its performance and durability.

DESCRIPTION OF THE PRIOR ART

Magnetic recording elements, for use with all types of media, suffer from several limitations including wear in the pole tip area from contact with the media, sensitivity to external electric fields, and sensitivity to external magnetic fields. When used in the write mode, the magnetic recording elements themselves radiate both electrical and magnetic fields which create problems for similar recording elements located in closely spaced positions. These limitations in the effectiveness of magnetic recording elements have been intensified in recent years due to the widespread use of thin film heads with their minimal dimensions and thicknesses and hence increased susceptibility to wear and to the loss of reliability due to external magnetic and electrical fields.

The traditional magnetic head design consists of a thin magnetic core element providing a closed loop path for magnetic flux and including a tiny gap providing leakage flux on one face thereof adjacent the recording media for writing, i.e., appropriately magnetizing with a preselected magnetic polarity a thin layer on the surface of the recording media. It will be recognized that the write flux field radiates in all directions from the gap in the core element during the application of a write current pulse; however, only one side of the gap (that facing the media) does the desired writing. The rest of the leakage about the edges of the gap results in a loss of efficiency for the head, and furthermore, a source of electrical and magnetic noise in an overall system which may include other magnetic recording elements in the near vicinity. Furthermore, the flux leakage at the side portions of the gap cause a fringing in the lateral direction (with respect to the relative direction of motion of the media) which results in the writing of a wider track upon the media than is desired. This limits the ability to more closely space the tracks in a given media area since the fringing effect at the side of the gap could adversely affect previously written adjacent tracks.

Because of the aforedescribed generation of electrical and magnetic fields during the write mode and the consequent susceptibility of closely spaced magnetic recording elements to interference with one another, the need to shield such elements has been heretofore recognized. For example, the well-known textbook, The Complete Handbook of Magnetic Recording, 4th Edition, by Finn Jorgensen, McGraw Hill, 1996, pages 300-301, suggests that the elimination of crosstalk between adjacent magnetic heads can be greatly reduced by the insertion of shields comprised of a Mumetal-copper-Mumetal sandwich between the individual core elements. Other prior art disclosures utilizing the insertion of magnetically conductive material as a shielding about the gap in the recording head core element include U.S. Pat. No. 4,656,546 to Mallory; U.S. Pat. No. 4,935,832 to Das et. al.; and IBM Technical Disclosure Bulletin, Volume 26, No. 7B, December 1983, pages 3748-3751.

SUMMARY OF THE INVENTION

In accordance with the present invention and in contrast to the prior art, it is desired to place the appropriate shielding and protective material directly adjacent to the sides of the gap other than that side directly facing the recording media. It will be understood that the term "directly adjacent" shall mean in contact with the material directly surrounding the gap or with only a very thin seed layer being interposed therebetween in the event that material-to-material bonding requirements necessitate it. While this type of gap enhancing structure finds particular utility in the so-called side core or third axis recording element, i.e., wherein the magnetic core element is mounted upon the side of the carrier element (slider) oriented in the direction of relative movement of the recording media, it will be apparent that the advantages of the present invention can be utilized with other magnetic head assemblies, such as the planar head, as will be described in greater detail hereinafter.

In order to limit the leakage flux from the gap other than at the writing face thereof, a layer of an electrically conductive and magnetically non-conductive material is placed directly adjacent to the gap on at least one of the faces thereof and, preferably, on all faces thereof other than the writing face. This has the effect of not only limiting the transmission of electrical and magnetic fields to adjacent recording elements but also of improving the efficiency of the head by concentrating or focusing virtually all of the leakage flux at the writing gap. This layer of electrically conductive material will obviously have no effect at DC levels, and its effect will be negligible at low frequencies. However, as the frequencies get into the megahertz range, the effect will become more pronounced. This will be seen to be of particular importance today where digital recording with high flux reversals per second data rates are more and more prevalent. It will be noted that those frequencies associated with the rise times in the write current pulses are extremely high and that these will be the most effected by the use of the electrically conductive layer or layers at the gap.

In order to prevent wear on the relatively fragile core element material, the layers of material which are placed adjacent to the gap on the sides thereof can provide wear resistance particularly in preventing track edge roll-off, or, alternatively, a separate layer of a highly wear resistant material may be provided which will not only prevent degradation of the flight surface of the core element material during operation by preventing both track edge roll-off as well as pole tip recession but which also will be particularly useful during the lapping step used in the initial manufacturing process to correctly set the throat height on the core element in preventing crumbling or other degradation of the core element material.

BRIEF DESCRIPTION OF THE DRAWINGS

FIG. 1 is an elevation view of a portion of a wafer used in the manufacture of the thin film magnetic heads of the present invention, such portion including three horizontal rows of individual magnetic head assemblies.

FIG. 2 is an enlarged isometric view of a portion of one of the magnetic head assemblies of FIG. 1 prior to the lapping thereof at the bottom surface to set the throat height at the gap of the core element.

FIG. 3 is a section taken along line 3—3 of FIG. 2.

FIG. 4 is an elevation view showing a second embodiment of the magnetic head of the present invention.

FIG. 5 is an enlarged section taken along the line 5—5 of FIG. 4.

FIG. 6 is a plan view of a third embodiment of the present invention illustrating a magnetic head of the planar type.

FIG. 7 is a section taken along the line 7—7 of FIG. 6.

FIG. 8 is an elevation view of a fourth embodiment of the present invention which utilizes conventional thin film deposition techniques in a third axis or side-core type of magnetic head.

FIG. 9 is a section taken along the line 9—9 of FIG. 8.

FIG. 10 is an enlarged section of the gap area portion of the magnetic head of FIG. 9.

DESCRIPTION OF THE PREFERRED EMBODIMENTS

In the preferred embodiments of the invention illustrated in FIGS. 1–5 and 8–10 of the drawings, the magnetic head core element of the present invention is embodied in a magnetic head assembly of the "third-axis" or "side-core" type, i.e., a head which has been provided on the side of the carrier or slider element parallel to the relative direction of motion of the recording media rather than on the rear face or underface thereof. The elements of the magnetic head are formed of thin film depositions and may be deposited on the carrier or slider element by using conventional thin film head manufacturing techniques. The manufacture of magnetic heads of this type is shown and described in my prior co-pending U.S. patent application Ser. No. 349,982, filed on Dec. 6, 1994, the disclosure of which is specifically incorporated herein by reference, and reference to such application may be had for a further and more complete description of the details wherein such magnetic heads are manufactured.

FIG. 1 of the drawings shows a portion of a wafer body 20 from which each of the magnetic head assemblies 22 of the side-core type will be cut. As is described in greater detail in the aforementioned U.S. patent application Ser. No. 349,982, each row in the array of heads 22 is first horizontally separated from the finished row therebelow along the lines 24a, 24b to eliminate the kerf area 26 therebetween. Then, the lowermost edge 24a of the remaining lowermost line of unfinished heads is lapped to establish the appropriate throat heights in each of the aligned heads 22 thereof. After lapping, the then finished row is severed from the row above along the lines 24a, 24b with the process being repeated as described. As each row of horizontally aligned magnetic head elements 22 is finished and separated from the remainder of the wafer, it is cut along the lines 26 to remove the kerf area 27 therefrom thereby providing the finished magnetic head assemblies 22 including a portion of the wafer body 20 which latter element becomes the carrier or slider element for the magnetic head assembly.

FIGS. 2 and 3 show a portion of one of the magnetic head assemblies 22 including the magnetic core element 30 thereof prior to the lapping of the lowermost surface 31 (FIG. 3) thereof to set the appropriate throat height at the gap 42 (FIG. 2). As can be seen, the magnetic head assembly is built up on the side face of the slider body 20 by first depositing a layer of spaced coil elements 32 (FIG. 3)—assuming a slider body of a non-electrically conductive material. The coil elements 32 are covered by a insulative layer 34, and the core element 30 is deposited thereon. A second layer of spaced coil elements 36 and insulative layer 38 are then deposited upon one of the legs of the core element 30 with the spaced coil elements 32, 36 being connected at the edges and being further connected at the opposed ends to a pair of electrical leads 39 on the face of the slider body 20 so as to form a complete coil about the core element for providing write current pulses or for reading output voltages.

Finally, a layer 40 of a hard substance that can be deposited by standard plating or sputtering methods, such as diamond-like carbon (DLC), is deposited directly atop the core element 30 adjacent to the gap 42 thereof as shown in FIG. 2. One of the purposes of this layer 40, which extends to the bottom face 31 of the core element (FIG. 3), is to provide a rigid support for the core element, particularly at the side edges thereof and in the narrow throat area, during the lapping process so as to prevent deformations and crumbling in the relatively soft core material. During the subsequent lapping operation the bottom surfaces of the slider 20 and the thin film layers 34, 30 and 40 of material are progressively lapped, or ground and then lapped, until the appropriate throat height is set in the gap 42. As indicated in FIG. 3, a final bottom surface level 44 is reached when the throat height is appropriately set in the magnetic core element 30. It will be recognized that the DLC element 40 placed directly in contact with the core element provides a rigid support for the core element during this lapping operation and that it will continue to provide a wear resistant surface protecting the core element during subsequent operation of the magnetic head assembly as the lowermost surface thereof comes into repeated scraping contacts with the underlying media surface. It will be recognized that the DLC layer 40 will not only prevent the outer edge of the core 30 at the track surface from wearing (track edge rolloff) but can significantly limit the wear (pole tip recession) over the entire pole tip surfaces of the core 30 which face the media. If the slider element 20 is made of a relatively hard material also, this protection feature is enhanced by placing hard protective surfaces on both sides of the relatively soft core material 30. Alternatively, another layer 40 of DLC or the like can be placed between the insulative layer 34 and the core layer 30 directly adjacent to the gap 42 to provide the protective feature.

While various materials may be chosen for the protective layer or layers 40, it is essential that such material be non-magnetically conductive, i.e., that it have properties which will not short the magnetic gap in the core element 30. In a second aspect of the present invention, the layer 40 may be formed of a material of high electrical conductivity but of a non-magnetically conductive material, such as copper. While the hardness protection of such material may be sacrificed somewhat (particularly in preventing pole tip recession), such a material provides another significant advantage. With high frequency radiation, e.g., in the megahertz range or greater, a copper layer 40 placed directly adjacent to the gap 42 provides skin effect properties due to its good electrical conductivity so that it effectively absorbs the electrical field while reflecting the magnetic field thereby significantly limiting the lateral fringing effect of the magnetic fields at the side of the gap. That is to say, since the reluctance of the material at the side of the gap provided by layer 40 increases relative to the reluctance of air under increasing electromagnetic frequencies, the particularly destructive electromagnetic radiation of the high frequency components of the conventional digital data recording environment can be significantly reduced by absorption within the narrow layer of the copper material 40. Obviously, the thickness of the layer 40 will be determined by the magnitudes of the frequencies which it is desired to block at the side of the gap, the particular layer 40 material chosen, and the frequency/skin effect relationship for such material.

A second embodiment of the invention is shown in FIGS. 4 and 5 and includes multiple layers of materials placed about the gap area in the magnetic core element to provide both flux focusing and wear protection in accordance with the present invention. The thin film magnetic head assembly 50 of FIGS. 4 and 5 is similar to that of the embodiment of the invention shown in FIGS. 1–3 in that it is of the side core or third axis type. Thus, the head assembly 50 is formed by a plurality of layers of material deposited by plating or other conventional thin film deposition techniques upon a side face of a slider element 55. The head assembly essentially comprises the magnetic core element 52, which has a gap 51 therein at the lowermost surface thereof to face the underlying recording media, and an electrical coil assembly 54 deposited about one of the legs of the core element and including electrical leads 53 for connection to the appropriate writing or reading circuitry. The successive layers to be deposited upon the face of the slider element 55 adjacent to the gap 51 in the core element are shown in FIG. 5. Thus, a thin insulative layer 56 can be placed on the face of the slider 55, if necessary, and followed successively by a layer 58 of copper or other electrically conductive/magnetically non-conductive material, the magnetically conductive core element 52, a second layer 59 of electrically conductive/magnetically non-conductive material, a thin layer 60 of a magnetically conductive material such as permalloy or iron tantalum nitride, and (at the outer face of the head assembly) a layer of a hard and wear resistant material 62 such as the diamond-like carbon previously described with respect to the first embodiment of the invention. It will be recognized that the layers of copper 58, 59, may be deposited directly in contact with the core element 52 so as to surround the gap 51 and increase the flux focusing effect by limiting the lateral fringing of the magnetic flux due to the high electrical conductivity of the copper material. This effect can be further enhanced by including a further layer 64 of copper at the top or back of the gap as shown in FIG. 4, such layer 64 extending between and connecting the layers 58 and 59. Obviously, this layer 64 may be deposited as a separate layer, or the deposition of the top layer 59 of the copper may simply be allowed to flow into the indicated area above the gap 51. As mentioned previously, the thickness of the layers 58, 59 will be decided by the nature of the material and its particular skin effect electrical conductivity at the high frequencies of electromagnetic radiation desired to be confined.

The thin magnetically conductive layer 60, which may be formed of a typical magnetically conductive material such as iron tantalum nitride or permalloy, acts to prevent external magnetic fields from migrating into and affecting the fields at the gap particularly during a reading operation. Obviously, the thickness of the copper layer 59 must be such so as to prevent the magnetic material of layer 60 from having any significant gap shorting effect upon the operation of the core element 52. In this regard, the layers 60 and 62 may be reversed in position if necessary; however, it is functionally preferable to keep the highly wear resistant material on the outer face of the head assembly due to ease of fabrication.

Furthermore, and as previously alluded to with respect to the first described embodiment of the invention, the slider element 55 may be formed of a material to accomplish some of the objectives of the present invention. For example, if the slider is made of a hard material, e.g., aluminum oxide or calcium titanate, solid wear protection is provided on both sides of the core element 52. If the slider is made of a magnetically conductive material, such as the commonly used manganese zinc ferrite, the slider will provide the shielding of the core element 52 from external magnetic fields in a manner similar to the layer 60; however, it must be remembered that sufficient spacing must be placed between the face of the slider and the core element 52 so as to prevent any gap shorting effect. If the slider is formed of an electrically conductive but not magnetically conductive material, such as the conventionally used aluminum-titanium-carbide or non-magnetic manganese zinc ferrite, the slider (at least in the gap area thereof) can be brought directly up to the face of the core element 52 to provide a good flux focusing effect.

As can be seen from FIGS. 4 and 5, the layers 58, 59, 60 and 62 of material are arranged to be deposited only along the lower edge of the core element 52 and particularly adjacent the gap 51 thereof so that they do not interfere with the coil assembly 54 or other areas of the core element 52.

A third embodiment of the invention is shown in FIG. 6 where it will be seen that the present invention can be adapted for use with a more or less conventional planar head, i.e., a magnetic head assembly wherein the magnetic core element and its gap are placed on the bottom surface of the slider rather than on the side surface or rear surface thereof as in the more conventional slider arrangements. Thus, planar head assembly 70 will be seen to be comprised of a core element 72 which is formed within a shallow slot in the bottom of the slider element and comprised of a thin film base layer 73 deposited at the base of the slot, a pair of stubs 74 extending upwardly from the base layer at each end thereof, and a pair of opposed pole tips 76 extending inwardly in opposed relationship to define a narrow gap 77 therebetween. As shown in FIG. 7, each of the pole tips 76 will be seen to be comprised of a underlying secondary layer 76a and a very thin film surface layer 76b which will be formed of a very high B-sat material particularly at the walls of the gap 77 and particularly on whichever of the poles 76 is arranged to be the trailing pole in the magnetic head assembly arrangement. The secondary layers 76a, the stubs 74, and the base layer 73 which complete the magnetic flux loop may all be formed of standard magnetic materials as used in thin film head production. Finally, in the conventional manner, several layers of electrical coils 78 are provided about each of the stubs 74 and are arranged to be connected to the appropriate write current circuitry or output read voltage circuitry for operation of the magnetic head assembly.

In accordance with the present invention, thin layers 80, 81 of a highly electrically conductive but nonmagnetically conductive material, such as copper, are deposited directly adjacent to the gap 77 (FIG. 6) so as to extend from the writing surface thereof to a level (FIG. 7) well below such surface to provide the flux focusing effect (concentration of the leakage flux at the writing face of the gap) as in the previously described embodiments of the invention. As further shown in FIG. 7, the two layers 80, 81 are connected across the bottom of the gap 77 by a connecting layer of copper 82 which is designed to underlie the gap area beneath the projecting pole tips provided by the high B-sat material 76b as well as the inner opposed faces of the pole tip elements 76a to further enhance the flux focusing effect.

A fourth embodiment of the invention is shown in FIGS. 8–10 again illustrating a side core mounted head assembly but one which can be formed using more or less conventional thin film deposition techniques and construction arrangements such as those of the conventional thin film heads wherein the head is formed on the trailing face of the slider. As particularly shown in FIG. 10 of the drawings, the head assembly 90 will be seen to be comprised of the slider body 91, a thin insulative layer 92, a layer of an electrically conductive and magnetically non-conductive material 93, a pole tip element 94, a second layer of electrically conductive and nonmagnetically conductive material 95, a thin magnetically conductive layer 96, and a final outer layer 97 of a hard wear resistant material. It will be recognized that this arrangement is essentially the same as that shown with respect to the FIG. 5 embodiment. Obviously, the choice of materials, the thicknesses of the layers, and the alternative arrangements of such layers as described with respect to the FIG. 5 embodiment of the invention will equally apply with respect to the FIGS. 8–10 embodiment of the invention.

In the FIGS. 8–10 embodiment of the invention, the two legs 100 and 102 (FIG. 8) comprising the main body portion of the magnetic core element are formed as successively deposited layers joined by a stub element 101 with an intervening layer or layers of coils 104 all of such elements being formed and placed upon the slider body as in the conventional thin film deposition processes. The only essential difference herein is that the uppermost leg 102 of the core element is dropped down and terminated at an edge 103 which lies on top of the pole tip element 94. The pole tip portion 100a of the bottom leg 100 thereby lies in the same plane as the pole tip element 94 of core leg 102 and is placed in opposed relationship as shown in FIG. 8 so as to define the narrow gap 98 therebetween for reading/writing. As can further be seen in FIG. 8, a layer of copper 99 or other electrically conductive and non-magnetically conductive material is placed atop the gap 98 so as to connect the electrically conductive layers 93 and 95 for a sufficient depth above the gap to appropriately enhance the flux focusing effect, all as has been hereinbefore described with respect to the prior embodiments of the invention.

Although the best modes contemplated for carrying out the present invention have been herein shown and described, it will be apparent that other modifications and variations may be made without departing from what is regarded to be the subject matter of the invention.

What is claimed is:

1. For use in a thin film magnetic head assembly operating with write currents having high frequency components, a thin film magnetic core element providing a closed loop magnetic flux path and having a pair of opposed pole pieces defining a gap in the closed loop path; said gap being having a cross section of generally rectangular shape and having a front face designed to face the recording media, a back face spaced from and generally parallel to the front face, and a pair of side faces interconnecting the front and back faces; and a pair of thin film metallic layers of electrically conductive and magnetically non-conductive material located directly adjacent to the pole pieces at the side faces of gap area thereof with one of such layers being located on each side of the gap to enclose the same and reduce magnetic flux leakage sideways from the gap.

2. A magnetic core element according to claim 1 including a third thin film metallic layer of electrically conductive and magnetically non-conductive material located at said back face of the gap.

3. A magnetic core element according to claim 2 wherein said layers are made of copper.

4. A magnetic core element according to claim 1 wherein at least one of said layers is of sufficient thickness and of a hard material so as to protect the edges of the core element material at the front face of the gap from undue wear.

5. A magnetic core element according to claim 1 including a thin film layer of a magnetically conductive material overlying one of the side faces of the gap area but being spaced outwardly therefrom to shield the gap from external electric and magnetic fields and to reduce the outward radiation of such fields which are generated at the gap.

6. A thin film magnetic head comprising a carrier member having a flight surface for air-bearing contact with an underlying recording medium and a side surface extending from an outer edge of the flight surface, a thin film magnetic core for providing a closed loop magnetic flux path mounted upon said side surface and having a pair of opposed pole pieces extending to the juncture of the surfaces, said pole pieces being closely spaced along a line extending from said juncture to define a narrow throat with the dimension of said pole pieces along said line defining a throat height, a thin film electrically conductive coil provided about the core and spaced from the throat, and a thin film layer of a hard non-magnetically conductive material overlying the pole pieces for protecting the edges thereof during both the removal of material therefrom after the initial deposition of the core to set the throat height and during operation with a particular underlying recording medium.

7. A thin film magnetic head according to claim 6 including a pair of layers of an electrically conductive and magnetically non-conductive material with one of such pair of layers of electrically conductive material being placed directly adjacent to the core at each side of the throat thereof.

8. A thin film magnetic head according to claim 7 including a third layer of electrically conductive and magnetically non-conductive material enclosing that portion of the throat spaced furthest from the flight surface.

9. A thin film magnetic head according to claim 7 wherein said pair of layers of electrically conductive material are made of copper.

10. A thin film magnetic head according to claim 9 wherein said layer of a hard material comprises at least one of said pair of layers of electrically conductive material.

11. A thin film magnetic head for operation with write currents having high frequency components, said head comprising a carrier member having a flight surface for air-bearing contact with an underlying recording medium and a side surface extending from an outer edge of the flight surface, a thin film magnetic core for providing a closed loop magnetic flux path mounted upon said side surface and having a pair of opposed pole pieces extending to the juncture of the two surfaces, said pole pieces being closely spaced along a line extending from said juncture to define a throat having sides defined by a pair of spaced parallel planes extending parallel to the side surface of the carrier member, a thin film electrically conductive coil provided about the core and spaced from the throat, and a pair of thin film metallic layers of electrically conductive and magnetically non-conductive material located in contact with the pole pieces at the throat area thereof with one of such strips being located on each side of the throat to enclose the same and reduce magnetic flux leakage sideways from the throat area.

12. A thin film head according to claim 11 including a third layer of electrically conductive and magnetically non-conductive material enclosing that portion of the throat spaced furthest from the flight surface.

13. A thin film head according to claim 12 wherein said layers are made of copper.

14. A thin film head according to claim 11 including a thin film layer of a magnetically conductive material overlying one of the sides of the gap area but being spaced outwardly therefrom to shield the gap from external electric and magnetic fields and to reduce the outward radiation of such fields which are generated at the gap.

15. For use in a magnetic head assembly operating with write currents having high frequency components, a magnetic core element providing a closed loop magnetic flux path and having a pair of opposed pole pieces defining a gap in the closed loop path with the gap being generally rectangular in cross section and having four faces as defined by the spacing between the four aligned edges of the opposed pole pieces wherein said improvement comprises a layer of an electrically conductive and magnetically non-conductive material located directly adjacent to the gap on at least one of the faces thereof other than the face arranged to be adjacent to the recording media in order to better focus the flux leakage at said face adjacent to the media.

16. A magnetic core element according to claim 15 wherein said layer is comprised of copper.

* * * * *